W. M. Harris,
Halter.
No. 100,031. Patented Feb. 22. 1870.
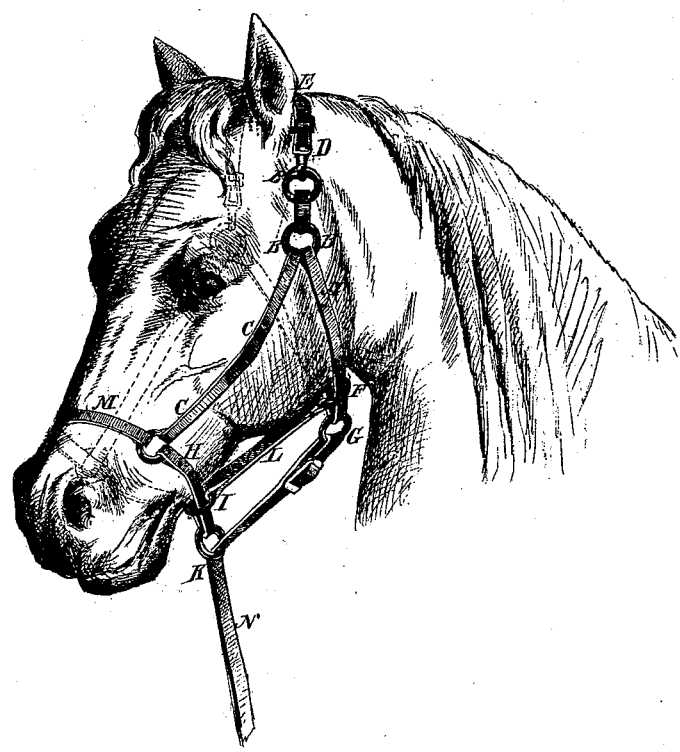

United States Patent Office.

WILLIAM M. HARRIS, OF DIXON, ILLINOIS.

Letters Patent No. 100,031, dated February 22, 1870.

IMPROVEMENT IN HALTERS.

The Schedule referred to in these Letters Patent and making part of the same.

*To all whom it may concern:*

Be it known that I, WILLIAM M. HARRIS, of Dixon, in the county of Lee, and State of Illinois, have invented a new and improved Halter; and I do hereby declare that the following is a full, clear, and exact description thereof, which will enable others skilled in the art to make and use the same, reference being had to the accompanying drawing forming part of this specification.

This invention relates to improvements in halters for horses and other animals, and consists in connecting the tie-strap to a ring suspended in a bight of the throat-strap, and passing it through another ring in the bight of the lower nose-strap, to slide freely in the latter ring, and in passing the bights or loops of both these straps through other rings before attaching the tie-strap ring to them, the said rings being connected by a strap extending from the nose-strap to the throat-strap under the center of the lower jaw.

The said arrangement is designed to apply the restraining force of the tie-strap on the nose, the throat, and top of the head, in a way to confine the head in a cramped position calculated to temporarily disable the animal when making efforts to escape.

The drawing represents a sketch of the head of a horse with my improved halter.

The throat-strap A is permanently connected to the rings B, which also receive the check-straps C and the head-strap E, the latter being made in three parts, two of which are connected by a snap-hook, D, for attaching and removing the halter, and the other connection is by a buckle for making the throat-strap more or less tight, and adjusting it to animals of different sizes.

Under the throat a loop or bight of this throat-strap passes through a ring, F, and supports another ring, G'; in like manner a bight or loop of the under nose-strap H passes through a ring, I, and supports a ring, K; the rings F and I are connected by a strap L.

The tie-strap N passes loosely through the ring K and is connected to ring G.

The strap L holds the strap H in the proper position under the lower jaw when there is little or no strain on the tie-strap, and when the latter is strained by the efforts of the animal to escape, the rings K and G are drawn together, and the force is expended on the nose by the upper nose-strap M, the throat by the throat-strap, and on the top of the head by the head-strap F, in such a way as to materially check and control the animal in his efforts to escape.

Having thus described my invention,

I claim as new and desire to secure by Letters Patent—

The combination with with the throat-strap A, and nose-strap H, of the rings F I G and K, straps L, and tie-strap N, when all are arranged substantially as specified.

W. M. HARRIS.

Witnesses:
J. M. HARRIS,
JEREMIAH MOSTRELLER.